United States Patent
Sullivan et al.

(10) Patent No.: US 9,304,508 B2
(45) Date of Patent: Apr. 5, 2016

(54) SYSTEM AND METHOD FOR PERFORMING UNDO AND REDO OPERATIONS DURING MACHINING SIMULATION

(71) Applicant: Mitsubishi Electric Research Laboratories, Inc., Cambridge, MA (US)

(72) Inventors: Alan Sullivan, Middleton, MA (US); Dmytro Konobrytskyi, Clemson, SC (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 531 days.

(21) Appl. No.: 13/869,135

(22) Filed: Apr. 24, 2013

(65) Prior Publication Data
US 2014/0324211 A1    Oct. 30, 2014

(51) Int. Cl.
*G05B 19/4097* (2006.01)
*G05B 19/4069* (2006.01)

(52) U.S. Cl.
CPC ........ *G05B 19/4097* (2013.01); *G05B 19/4069* (2013.01); *G05B 2219/35065* (2013.01)

(58) Field of Classification Search
None
See application file for complete search history.

(56) References Cited

U.S. PATENT DOCUMENTS

| 6,523,134 | B2 | 2/2003 | Korenshtein | |
| 2008/0250314 | A1* | 10/2008 | Larsen | G06F 17/50 715/705 |
| 2010/0050188 | A1 | 2/2010 | Schellingerhout et al. | |
| 2010/0298961 | A1* | 11/2010 | Frisken | G05B 19/4069 700/103 |

FOREIGN PATENT DOCUMENTS

EP    2254013 A1    11/2010

OTHER PUBLICATIONS

Blasquez et al. 'Undo facilites for the extended z-buffer in NC machining simulation' Computers in Industry vol. 53 pp. 193-204, Elsevier(2004).*

Sullivan et al. "High Accuracy NC Milling Simulation using Composite Adaptively Sampled Distance Fields," Computer Aided Design, vol. 44, No. 6, Jun. 1, 2012. pp. 522-536.

* cited by examiner

*Primary Examiner* — Mohammad Ali
*Assistant Examiner* — Bernard G Lindsay
(74) *Attorney, Agent, or Firm* — Dirk Brinkman; Gene Vinokur

(57) ABSTRACT

A method associates a cell in the composite adaptive distance field (cADF) with a machining instruction that changes a type of the cell or a type of a distance field in the cell in forming a composite surface of the workpiece to produce at least part of an association, and associates the distance field in the cell with the machining instruction changing the type of the distance field in forming the composite surface of the workpiece to produce at least part of the association. In response to receiving a command to undo a simulation of the machining to the intermediate machining instruction, a subset of cells and a subset of distance fields forming the composite surface of the workpiece at a time of the simulation by the intermediate machining instruction are identified using the association and the intermediate representation of the workpiece is determined using the subset of cells and the subset of distance fields.

11 Claims, 13 Drawing Sheets

| Cell # | $T_{CB}$ | $T_{CI}$ | $T_{CE}$ | $T_{SB}$ | $T_{SE}$ |
|---|---|---|---|---|---|
|  |  |  |  |  |  |
|  |  |  |  |  |  |

FIG. 6D

SYSTEM AND METHOD FOR PERFORMING UNDO AND REDO OPERATIONS DURING MACHINING SIMULATION

FIELD OF THE INVENTION

The invention relates generally to simulating NC machining, and more particularly to performing undo and redo of simulated machining operations.

BACKGROUND OF THE INVENTION

NC Machining

Simulating numerically controlled (NC) machining is of fundamental importance in computer aided design (CAD), and computer aided manufacturing (CAM). During simulation, a computer model of a workpiece is edited with a computer representation of an NC machining tool and a set of NC machining tool motions to simulate the machining process.

The workpiece model and tool representation can be visualized during the simulation to detect potential collisions between parts, such as the workpiece and a tool holder, and after the simulation to verify a final shape of the workpiece.

The final shape of the workpiece is affected by the selection of the tool and tool motions. Instructions for controlling these motions are typically generated using a computer aided manufacturing system from a graphical representation of the desired final shape of the workpiece. The motions are typically implemented using numerical control programming language, also known as preparatory code or G-Codes, see the following standards RS274D and DIN 66025/ISO 6983.

The G-Codes generated by the CAM system may not produce an exact replication of the desired shape. In addition, the movement of the NC tool is governed by motors used for the NC machining, which have limited speeds, ranges of motion, and abilities to accelerate and decelerate, so that the actual tool motions may not exactly follow the NC machine instructions.

Discrepancies between the actual final shape of the workpiece and the desired shape of the workpiece may be very small. In some situations, these discrepancies can result in undesirable gouges or nicks in the surface of the final shape of the workpiece with sizes on the order of a few micrometers in depth and width, and tens of micrometers in length.

Typically, a set of NC machining instructions is tested by machining a test workpiece made of softer, less expensive material prior to machining the desired part. If visual inspection of the test workpiece locates undesirable discrepancies in the test workpiece, the NC machine instructions can be modified accordingly.

This manual testing is time consuming and expensive. Time for machining a single test workpiece may be on the order of hours and several iterations may be required before an acceptable set of NC machine instructions is attained. Thus, it is desirable to test for these discrepancies using computer-based simulation and rendering.

The machining instructions needed to produce large and/or complex work pieces are time consuming to simulate. Thus, it can be useful to be able to undo the simulated effects of a set of the machining instructions containing a defect and to replace them with an alternate set of the machining instructions that are free of defects. Furthermore, being able quickly undo to any arbitrary the machining instruction within the set of machining instructions enables locating the machining instruction responsible for the simulated defect. Therefore it can be desirable to have a capability to undo the simulated machining operations.

The conventional solutions provide only for sequential undo/redo operations, i.e., one change or operation at the time repeated as many times as necessary. However, the simulation of the machining can include millions of operations, and sequential undo/redo operations can be slow and inefficient. For example, a method described in U.S. 2010/0050188 stores a starting point of representation and a history of the changes to a representation. In order to undo back to a certain step, the starting point is reloaded and the steps in the history are re-applied until the desired step is reached. That solution is not suitable for large machining simulation programs, as it results in many files that need to be stored. Also, that method provides only for continuous, i.e., sequential, undo operations.

Accordingly, it is desired to provide rapid undo/redo operations of the simulation of the machining of the object. Making undo/redo operations rapid allows independent analysis of various stages of the machining.

SUMMARY OF THE INVENTION

It is an objective of some embodiments of the invention to provide is a method for performing undo/redo operations using a simulator for machining. It is also an object of some embodiments to provide a method suitable for determining an intermediate representation of a workpiece corresponding to an intermediate instruction from a set of machining instructions simulating a machining of the workpiece represented by a composite adaptive distance field (cADF).

Various embodiments of the invention are based on a realization that if an intermediate machining instruction used for simulating the machining of the workpiece is associated with the composite surface at the time of simulating the machining by the intermediate machining instruction, than an intermediate representation of a workpiece corresponding to the intermediate instruction can be restored using the associated composite surface, which reduce or avoid the necessity to sequentially rewind the effects of the simulation back to the intermediate machining instruction.

Accordingly, some embodiments of the invention associate each geometrical element of a representation of a simulation with the machining instruction changing a type of a geometrical element in forming a composite surface of the workpiece to produce at least part of an association. The association is used to identify, in response to receiving a command to undo a simulation of the machining to the intermediate machining instruction, a subset of geometrical elements forming the composite surface of the workpiece at the time of the simulation by the intermediate machining instruction.

Various embodiments of the invention use different types of representation of the machined workpiece. For example, some embodiments of the invention are described in the context of a particular representation of a machined workpiece, i.e., the composite adaptively sampled distance field (cADF) representation. The specific representation allows modifying the association to enabled rapid determination of the geometrical elements forming the composite surface.

Accordingly, one embodiment of the invention discloses a method for determining an intermediate representation of a workpiece corresponding to an intermediate instruction in a set of machining instructions simulating a machining of the workpiece represented by a composite adaptive distance field (cADF). The method includes associating a cell in the cADF with a machining instruction that changes a type of the cell or a type of a distance field in the cell in forming a composite surface of the workpiece to produce at least part of an association; associating the distance field in the cell with the machining instruction changing the type of the distance field in forming the composite surface of the workpiece to produce at least part of the association; identifying, using the association and in response to receiving a command to undo a simulation of the machining to the intermediate machining instruction, a subset of cells and a subset of distance fields forming the composite surface of the workpiece at time of the simulation by the intermediate machining instruction; and determining the intermediate representation of the workpiece using the subset of cells and the subset of distance fields. The steps of the method are performed by a processor.

Another embodiment discloses a method for determining an intermediate representation of a workpiece corresponding to an intermediate instruction from a set of machining instructions simulating a machining of the workpiece. The method includes associating each geometrical element with the machining instruction changing a type of a geometrical element in forming a composite surface of the workpiece to produce at least part of an association, such that the geometrical element is associated at least with one or combination of a machining instruction causing the geometrical element to start forming a part of the composite surface of the workpiece and a machining instruction causing the geometrical element to stop forming the part of the composite surface of the workpiece; identifying, using the association and in response to receiving a command to undo a simulation of the machining to the intermediate machining instruction, a subset of geometrical elements forming the composite surface of the workpiece at time of the simulation by the intermediate machining instruction; and determining the intermediate representation of the workpiece using the subset of geometrical elements. The steps of the method are performed by a processor.

Yet another embodiment discloses a numerically controlled (NC) machining simulation system, including a memory storing a computer aided design (CAD) model of a workpiece, a NC machining console for determining a set of machining instructions; a processor for simulating machining of the workpiece according to the machining instructions, wherein the processor associates each geometrical element with the machining instruction changing a type of a geometrical element in forming a composite surface of the workpiece to produce an association; and a display device, wherein the processor is configured to render an intermediate representation of the machined workpiece corresponding to an intermediate machining instruction based on the association.

BRIEF DESCRIPTION OF THE DRAWINGS

FIG. 6D is an example of an association used by some embodiments of the invention;

DETAILED DESCRIPTION OF THE PREFERRED EMBODIMENT

System and Method Overview

Figure 1:
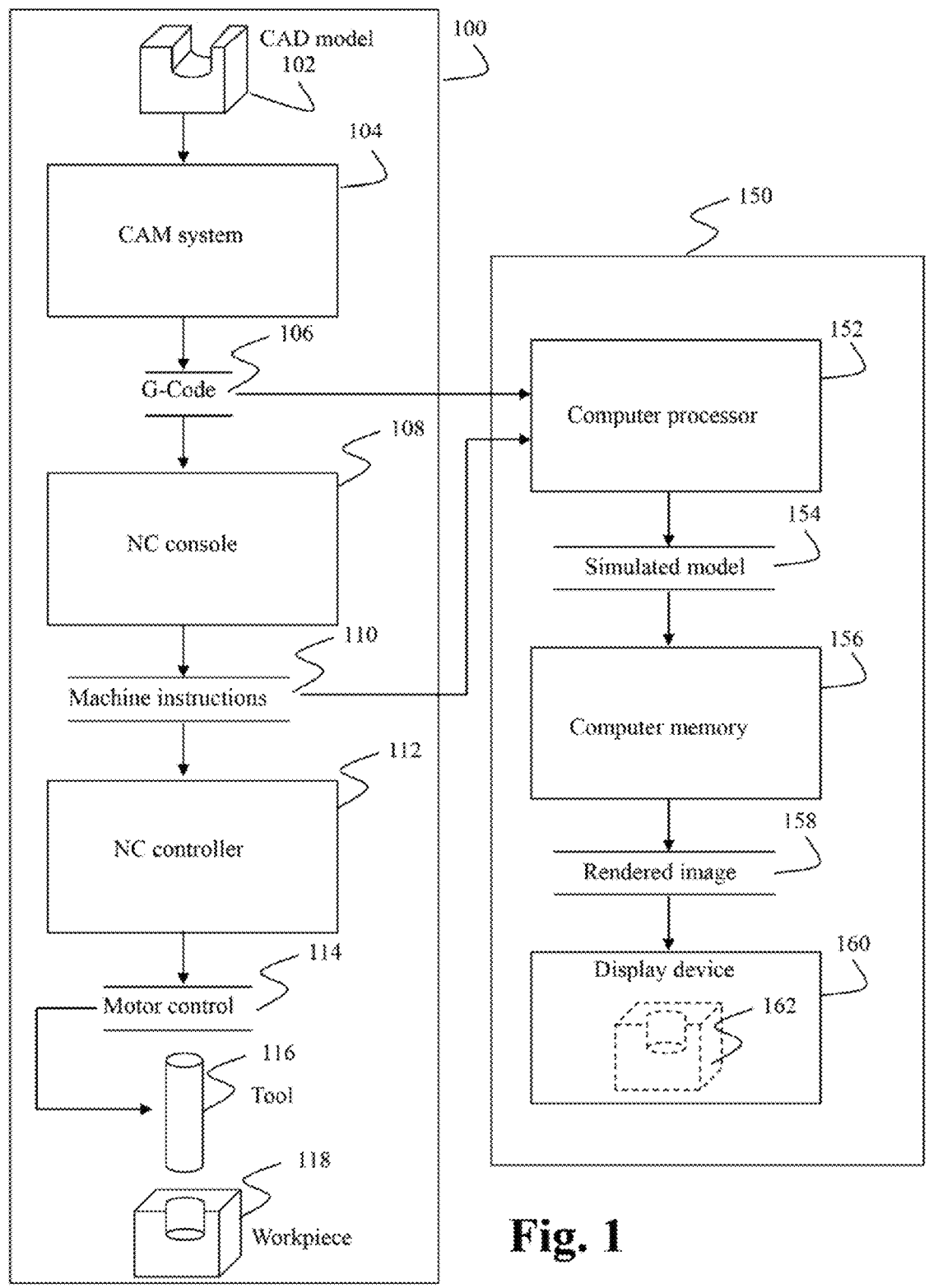
FIG. 1 is a flow diagram of an NC machining machine and a system and method for simulating NC machining according to embodiments of the invention.

FIG. 1 shows an NC machining system 100, and a numerically controlled (NC) machining simulation system 150. In the NC machining system 100, a computer aided design (CAD) model 102 is input to a computer aided manufacturing (CAM) system 104, which generates G-Codes 106 for controlling an NC machining machine. During NC machining, the G-Codes are input to an NC machining console 108, which processes each G-Code to produce a corresponding set of NC machine instructions 110. The NC machine instructions are input into an NC controller 112, which produces a set of motor control signals 114 to move a tool 116 relative to a workpiece 118 in order to machine the workpiece.

The simulation system 150 can take as input either the G-Codes 106 generated by the computer aided manufacturing system 104, or the NC machine instructions 110 generated by the NC console 108. The input to the simulation system is accessed by a processor 152, which simulates machining of the workpiece, and outputs a simulated model 154, which can be stored in a memory 156. The processor 152 can render the stored simulated model 154 to render an image 158, which can be output to a display device 160. A displayed image 162 can be compared to the computer aided design model 102 to verify the G-Codes 106 or NC machine instructions 110 prior to performing the actual NC machining of the workpiece.

Tools

Figure 2A:
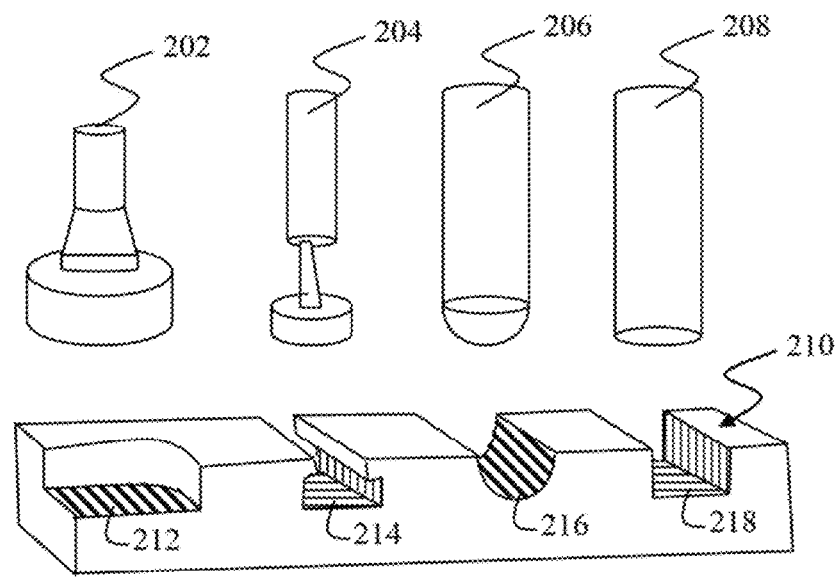
FIG. 2A is a diagram of typical tools used for machining and typical edits in a workpiece made by moving such tools along a path.

FIG. 2A shows a set of typical tool shapes 202, 204, 206, and 208 used in NC machining. When a tool is moved relative to a workpiece 210, the tool machines material out of the workpiece. Here, the tools 202, 204, 206, and 208 remove material corresponding to surfaces 212, 214, 216, and 218 from the workpiece. The shape of the material removed by each tool is determined by the shape of tool shape and the path of the tool relative to the workpiece. The shape of the material removed is an intersection of the workpiece and the swept volume of the tool as the tool moves along the path.

Although, we focus here on NC machining simulation, swept volumes have applications in many areas of science, engineering, and computer graphics including CAD, freeform design, solid modeling, robotics, manufacturing automation, and visualization.

Swept Volume

During machining, a tool moves relative to the workpiece according to a prescribed tool motion, referred to herein as a tool path, where the tool path can contain information about the relative position, orientation, and other shape data of the tool with respect to the workpiece.

As the tool moves along the tool path, the tool carves out a "swept volume." During machining, as the tool moves along the tool path, a portion of the workpiece that is intersected by the swept volume is removed. The removal can be modeled in the processor as a constructive solid geometry (CSG) difference operation, in which the portion of the workpiece is removed from the workpiece using a CSG operation, which subtracts the swept volume from the workpiece.

Figure 2B:
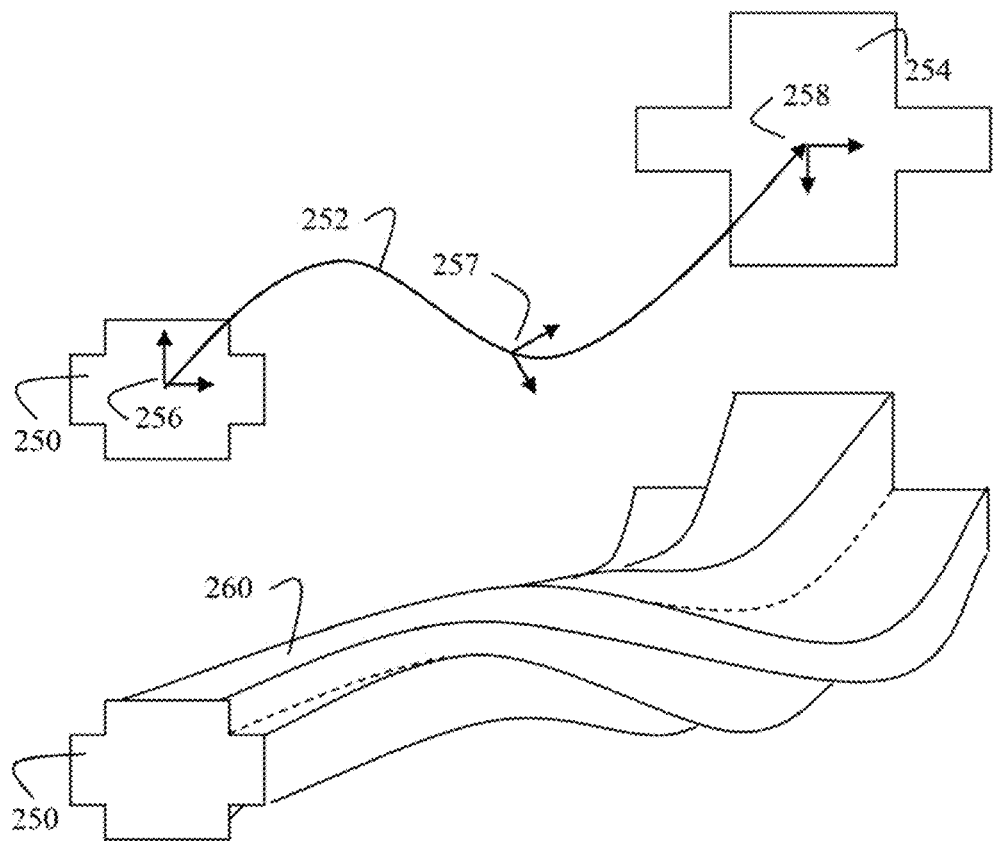
FIG. 2B is a schematic of a swept volume determined by sweeping a 2D shape along a curved path.

FIG. 2B shows the swept volume 260 of a shape 250 that is moved along a path 252. The path 252 specifies a position of a particular point of the shape 250 as a function of time. The path can specify an orientation 256, 257, and 258 of the shape as a function of time. The path can also specify a scale of the shape or an arbitrary transformation of the shape as a function of lime. In FIG. 2B, the original position, orientation, and geometry of a shape 250 is transformed to a final position, orientation, and geometry of the shape 254 as it moves along the path.

Tool Paths

The path of the tool relative to the workpiece can be specified in many forms.

Figure 3A:
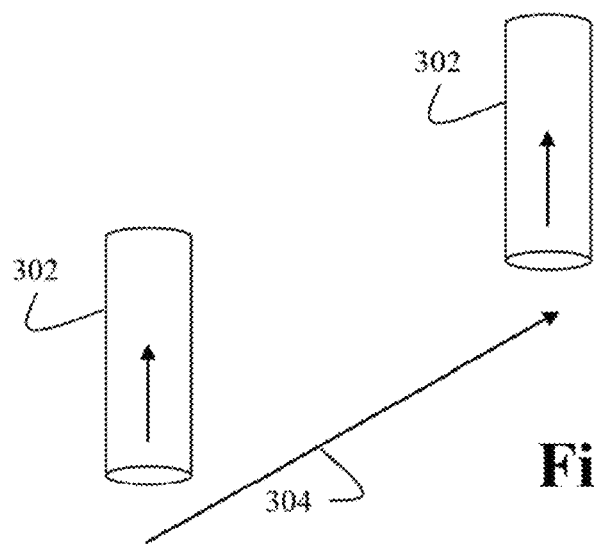
FIG. 3A is a schematic of a linear path of a tool.

FIG. 3A shows a linear path, in which a tool 302 is moved along a straight line 304.

Figure 3B:
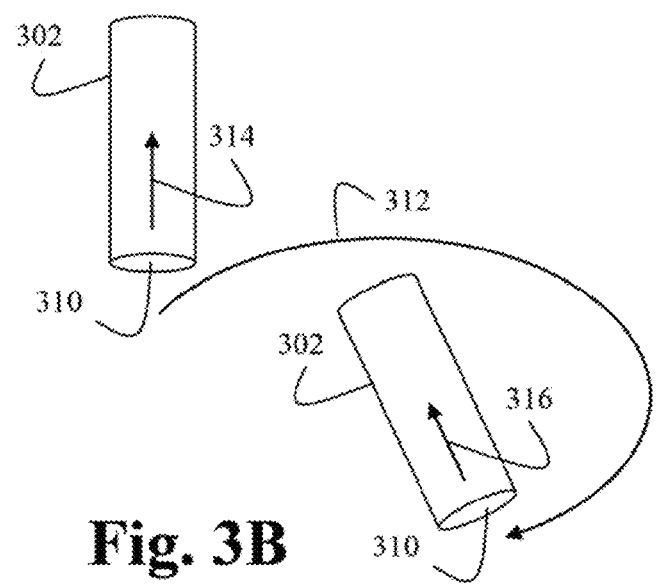
FIG. 3B is a diagram of an arc path of a tool in which the tool axis changes along the path.

FIG. 3B shows a circular arc path, in which a tip 310 of the tool 302 is moved along a circular arc 312, and an original axis direction 314 of the tool is transformed to a final axis direction 316 at the end of the path.

Figure 3C:
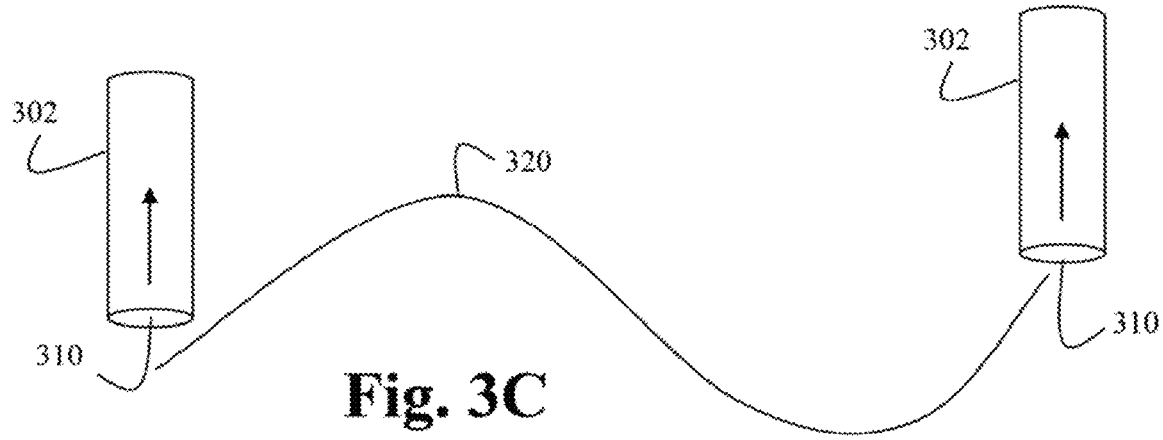
FIG. 3C is schematic of a curve path of a tool.

FIG. 3C shows a curved path, in which the tip 310 of the tool 302 is moved along a curve 320.

Other possible path forms include positioning the tool at a point, moving the tool along a sequence of lines known as a polyline, moving the tool along a spiral or helical curve, moving the tool along a polynomial curve, such as a quadratic Bezier curve or a cubic Bezier curve, or a sequence of polynomial curves known as a piecewise polynomial curve to name but a few. Any form of path that can be simulated can be considered, including a path defined by a procedure such as a path that is influenced by the shape or material composition of the workpiece.

Machining Simulation

Figure 4:
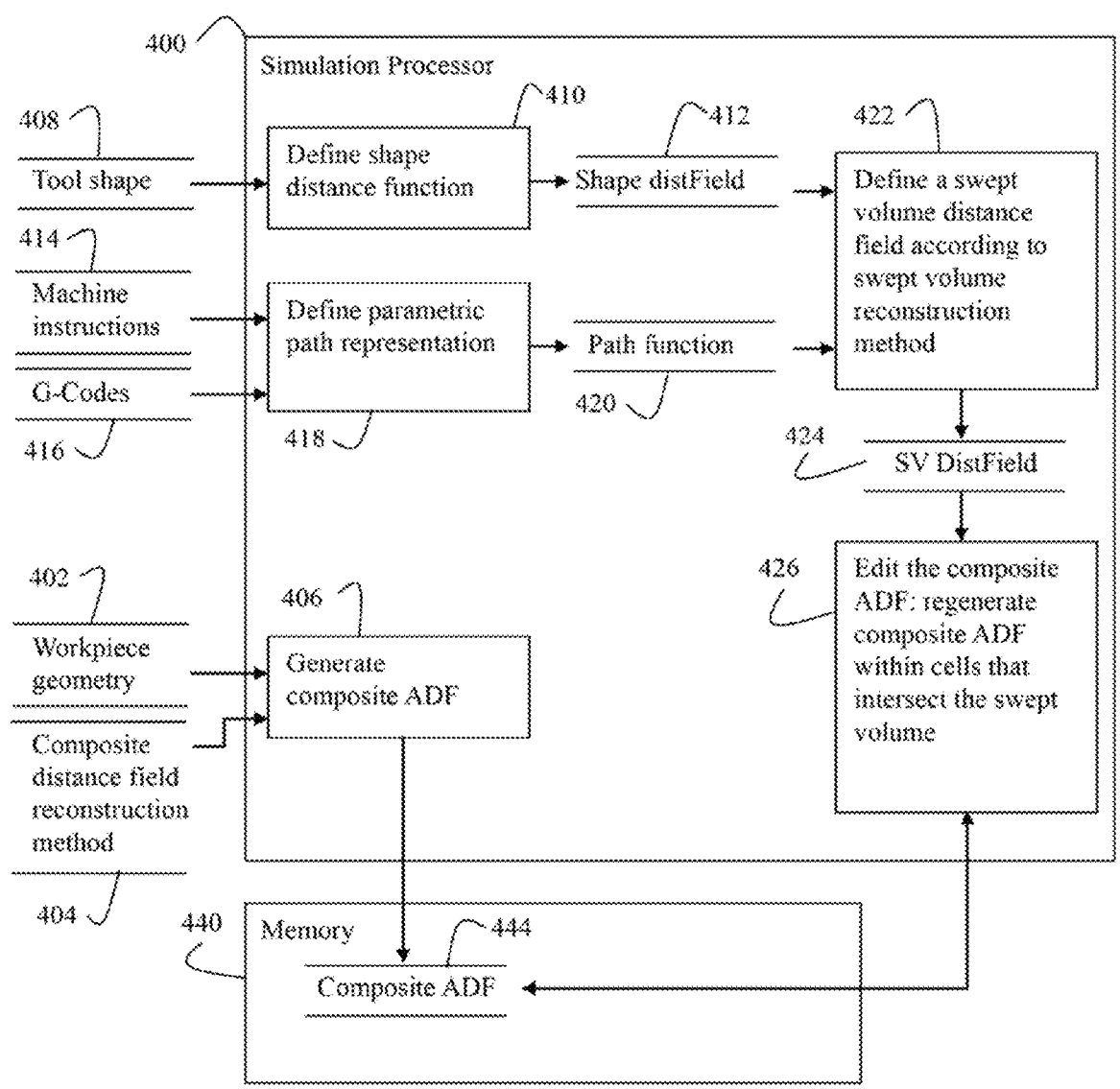
FIG. 4 is a flow diagram of method for simulating machining of a workpiece with a tool shape using a set of G-Codes or NC machine instructions according to an embodiment of the invention.

FIG. 4 shows a method for simulating machining of a workpiece with a tool shape using a simulation processor 400, storing a representation of the milled workpiece in a memory 440, and rendering the representation of the milled workpiece using a rendering processor 460 to a display device 480.

A workpiece shape and a method for reconstructing a composite distance field from a set of distance fields 404 are used to generate composite adaptively sampled distance field (cADF) 444, which may be stored in the memory 440. The workpiece shape is specified by the workpiece geometry 402, which comprises a set of geometric elements.

Each geometric element of the workpiece geometry is converted to a distance field representation, specifying a set of geometric element distance fields. Each geometric element distance field can be represented as one of an analytic distance function, an implicit distance function, a regularly sampled distance field, an ADF, a composition of distance functions, or a procedure, to name but a few.

The cADF is stored in a memory as an octree, which is generated in a top down manner starting with a root cell enclosing a bounding box of the workpiece shape. A distance field representation of each particular geometric element in the workpiece geometry 402, is used to edit leaf cells of the composite ADF whose distance fields are influenced by the particular geometric element.

Figure 5:
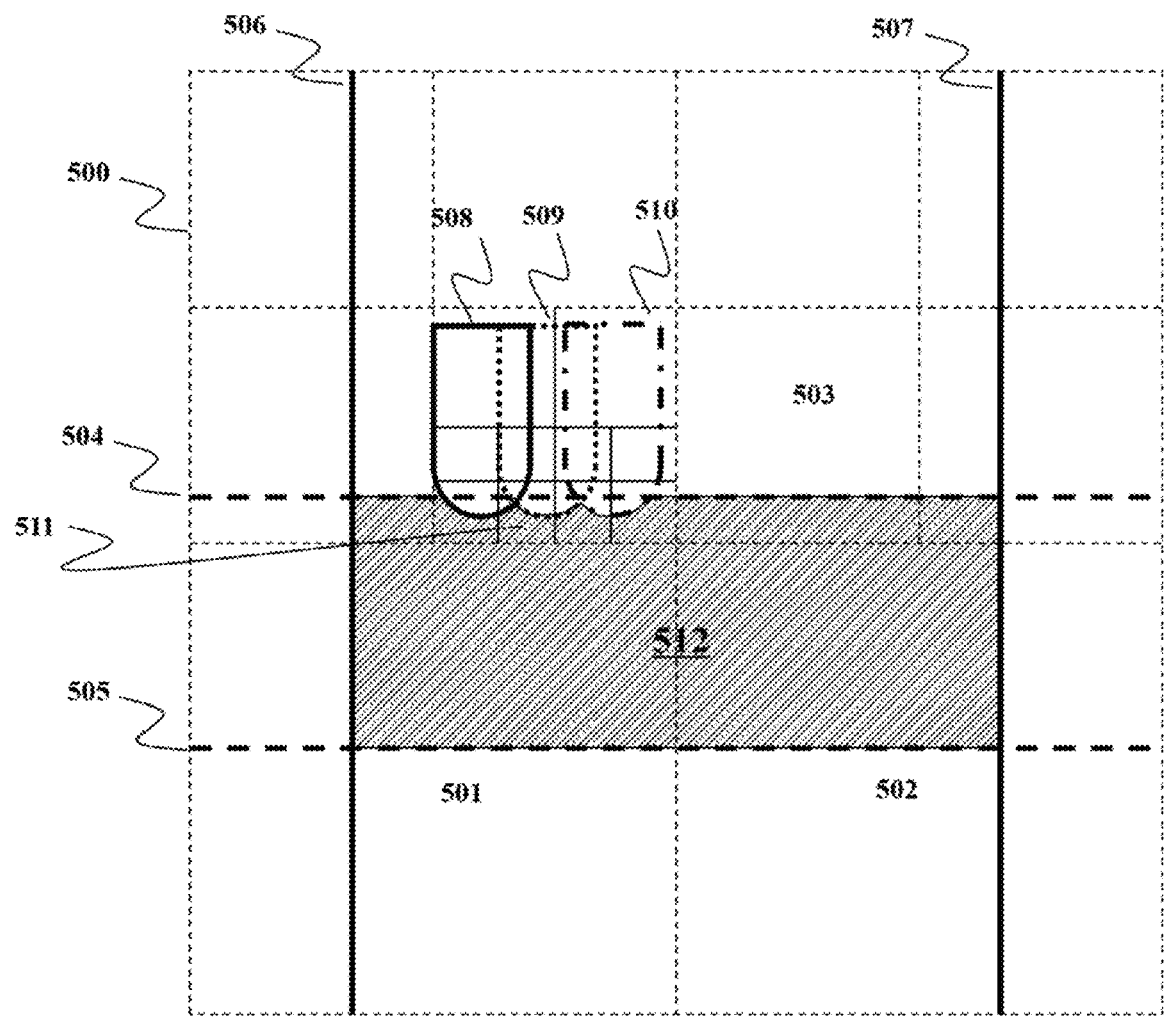
FIG. 5 is a schematic of a composite ADF.

FIG. 5 is a 2D schematic of a cADF 500 that includes a spatial hierarchy of cells, e.g., 501, 502 and 503, arranged in an octree, with each cell representing portions of the volume of the workspace as well as geometric element distance fields whose boundaries are indicted. In this example, the boundaries of geometric distance fields 504-507 are planes that defined the boundary of the initial workpiece. Geometric element distance fields 508-510 are the boundaries of three geometric elements representing sweeps of a ball end mill tool 206. Each cell in the cADF is associated with a subset of the set of geometric element distance fields representing the original workpiece and the swept volumes of the machining tool. For example, the subset of the set of geometric element distance fields associated with cell 511 includes geometric element distance fields 504, 508, and 509 that together determine the cADF surface within cell 511. Also associated with the cell is a procedural reconstruction method, such as a Boolean difference, for combining the subset of the set of geometric element distance fields to reconstruct the composite distance field of the workpiece. We define a composite surface to be the boundary of the simulated workpiece consisting of patches of the boundaries of the geometric element distance fields.

Some embodiments of the invention are described in the context of a particular representation of a machined workpiece: the cADF representation. In the cADF representation the volume of the machining simulation is partitioned into sub-volumes, known as cells, of varying size. In one embodiment the cells are cubic in shape with normalized sizes that are a power of two with respect to a largest volume, i.e., ½, ¼, 1/64, etc. Cells can be of four types: exterior to the boundary of the workpiece (exterior cells), interior to the boundary of the workpiece (interior cells), a cell can contain the boundary of the workpiece (boundary cells), or a cell can contain other smaller cells (intermediate cells), where some of these smaller cells include the boundary of the workpiece.

Within each boundary cell, the boundary of the machined workpiece is represented by the Boolean difference of a distance field. The distance field implicitly defines the boundary of a volume by enabling the computation, for any point in space, p, the shortest, or Euclidean, distance, D(p), to the boundary of the volume. The collection of points for which the distance field has a value of zero corresponds to the boundary of the volume defined by the distance function. The distance field commonly returns a signed distance value in which the sign of the distance value identifies whether the point is on the inside (positive value), or outside (negative value) of the boundary of the volume.

Complex boundaries, such as might be used in machining simulation, can be represented by the Boolean intersection of a set of distance fields. The Boolean intersection means that a point, p, is inside of the complex boundary only if it is the values of all of the distance fields at point p are positive. Similarly a point p is only on the complex boundary if the values at point p of one or more distance fields is zero, and the values at point p of the remaining distance fields are positive. The complex boundary of the machined workpiece is composed of the intersections of the boundaries of a set of distance fields, and is called the composite boundary.

Each distance field in the cADF representation of the machined workpiece corresponds to the volume that is inside of the sweep to the machining tool for a single step in the machining program. The sign of the distance field associated with the swept cutting tool is negated because the cutting tool is removing material from the workpiece, with the effect that the inside of the swept volume of the tool is guaranteed to be outside of the workpiece.

During machining simulation, the elements of the cADF representation, i.e., the set of cells and the sets of distance fields within the set of cells, undergo changes in their types or states as the machining program is applied. For example, cells are initially inside of the boundary of the workpiece, but can transition to become boundary cells, intermediate cells, or exterior cells at different steps in the machining program. Likewise, the distance fields within the cells become part of the composite boundary at some step in the machining program, and then a later machining program step may cut deeper into the workpiece causing the distance function to no longer contribute to the composite boundary.

Recording Undo Information

Various embodiments of the invention are based on a realization that if an intermediate machining instruction used for simulating the machining of the workpiece is associated with the composite surface at the time of simulating the machining by the intermediate machining instruction, then an intermediate representation of a workpiece corresponding to the intermediate instruction can be restored using the associated composite surface, which reduce or avoid the necessity to sequentially rewind the effects of the simulation back to the intermediate machining instruction.

Accordingly, some embodiments of the invention associate each geometrical element with the machining instruction changing a type of a geometrical element in forming a composite surface of the workpiece to produce at least part of an association. The association is used to identify, in response to receiving a command to undo a simulation of the machining to the intermediate machining instruction, a subset of geometrical elements forming the composite surface of the workpiece at the time of the simulation by the intermediate machining instruction.

Figure 6A:
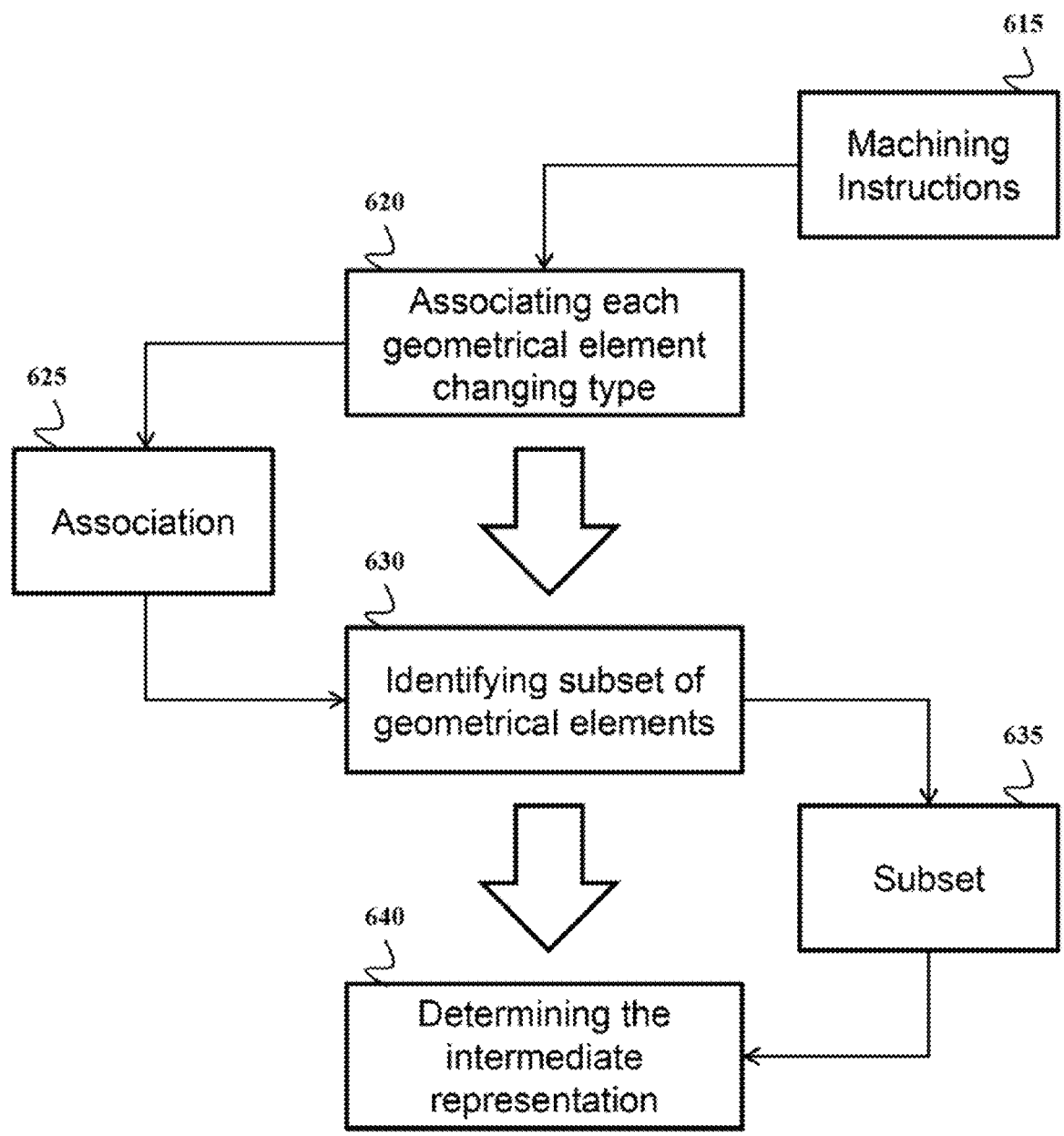
FIG. 6A is a block diagram of a method for determining an intermediate representation of a workpiece according to one embodiment of the invention.

FIG. 6A shows a block diagram of a method for determining an intermediate representation of a workpiece corresponding to an intermediate instruction from a set of machining instructions 615 simulating a machining of the workpiece according to one embodiment of the invention. Steps of the method can be implemented using a processor.

Each geometrical element is associated 620 with the machining instruction from the set 615 changing a type of a geometrical element in forming a composite surface of the workpiece to produce at least part of an association 625. For example, the geometrical element is associated with a machining instruction causing the geometrical element to start forming a part of the composite surface of the workpiece. Similarly, the geometrical element is associated with a machining instruction causing the geometrical element to stop forming the part of the composite surface of the workpiece.

In response to receiving a command to undo a simulation of the machining to the intermediate machining instruction, the method identifies 630, using the association 625, a subset 635 of geometrical elements forming the composite surface of the workpiece at time of the simulation by the intermediate machining instruction. The intermediate representation of the workpiece is determined 640 using the subset of geometrical elements.

Various embodiments enable rapid and independent undo/redo operations for each stage of the simulation. Advantageously, the rendering of the intermediate representation of the workpiece is possible without altering the final representation of the machined workpiece.

Various embodiments of the invention use different types of representation of the machined workpiece. For example, some embodiments of the invention are described in the context of a particular representation of a machined workpiece, i.e., the cADF representation. The specific representation allows modifying the association to enabled rapid determination of the geometrical elements forming the composite surface.

Figure 6B:
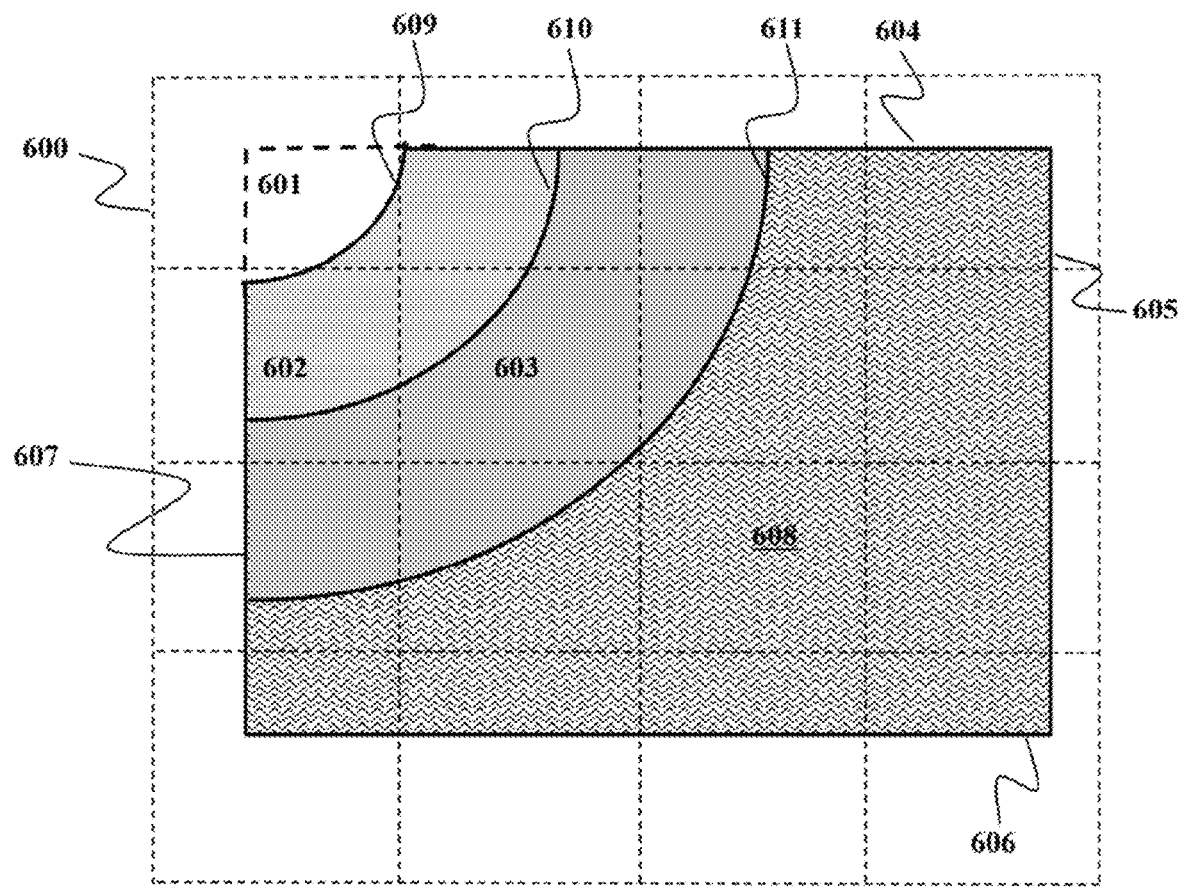
FIG. 6B is a two-dimensional illustration of one embodiment of the invention.

FIG. 6B shows a two-dimensional illustration of one embodiment of the invention. A cADF 600 includes a spatial hierarchy of cells, e.g., 601, 602 and 603, arranged in an octree with each cell representing portions of the volume of the workspace. The boundaries of planar geometric elements 604, 605, 606 and 607 form the composite boundary of the initial workpiece 608. The initial workpiece has subsequently been subjected to simulated machining by geometric elements 609, 610, and 611.

For the purposes of illustrating the embodiment of the invention, the four geometric elements 604, 605, 606 and 607 that form the composite boundary of the initial workpiece become part of the composite boundary at machining instructions 1, 2, 3, and 4, respectively, while geometric elements 609, 610 and 611 become part of the composite surface of the machined workpiece at machining instructions 5, 6 and 7, respectively.

In accordance with one embodiment, each cell of the cADF is associated with additional information to undo simulated machining. Specifically, a cell in the cADF is associated with a machining instruction changing a type of the cell or a type of a distance field within the cell in forming a composite surface of the workpiece to produce at least part of an association. Similarly, the distance field within the cell is also associated with the machining instruction changing the type of the distance field in forming the composite surface of the workpiece to produce at least part of the association. Such dual association allows for a faster determination of the geometrical elements forming the composite surface.

For example, the association can include numbers representing an ordering of the set of machining instructions. Such ordering reduces a size of the association. This is because the order of the intermediate machining instruction allows considering the changes of the composite surface made by "older" machining instructions and ignoring changes made by "younger" machining instruction.

For example, in one embodiment, the numbers includes timestamps of the simulating according to the machining instructions, such that the timestamp of a machining instruction associates the machining instruction with the cell and with the distance field changing types at the timestamp. Advantageously, the timestamps provide a natural order of the machining instructions.

In one embodiment each cell is associated with a set of three integers, hereafter referred to as cell type timestamps, which identifies the machining instruction that causes the cell to change its type. In one embodiment of the invention there are three cell type timestamps that indicate: (1) the machining instruction that causes the cell to change from an interior-type leaf cell to a boundary-type leaf cell, referred to as $T_{CB}$, (2) the machining instruction that causes the cell to change from a boundary-type leaf cell to a intermediate-type cell, referred to as $T_{CI}$, and (3) the machining instruction that causes the cell to change from any type cell to exterior-type leaf cell, referred to as $T_{CF}$, respectively.

During the creation of the cell, one embodiment presets each of the cell type timestamps to a preset value $T_P$ that indicates that its value is not active. For example, if cell type timestamps store the machining instruction in the form of an integer value, then $T_P$ can be made equal to a largest possible integer, referred to as INT_MAX.

In FIG. 6B, the cell 601 is an interior-type leaf cell until machining instruction 1, at which time the type of cell 601 is changed to boundary-type due to the effect of geometric element 604. Cell 601 undergoes a second change in type at machining instruction 6, when geometric element 610 cause cell 601 to change to exterior-type. Therefore, cell 601 will have $T_{CB}$=1, $T_{CI}$=$T_P$ and $T_{CE}$=6. Likewise during machining instruction 6, cell 603 changes from interior-type to boundary-type because geometric element 610 cuts more deeply into the workpiece than geometric element 609. Therefore, cell 603 is associated with $T_{CB}$=6, $T_{CI}$=$T_P$ and $T_{CE}$=$T_P$.

In some embodiments, the geometrical elements, e.g., the distance fields within the cell, are also associated with the machining instruction changing the type of the distance field in forming the composite surface of the workpiece. For example, in one embodiment each cell is associated with additional information, for example in the form of a set of integers, hereafter referred as geometric element timestamps, associated with each of the geometric elements within the cell.

In one embodiment of the invention there are two geometric element timestamps for each geometric element within a cell. The first geometric element timestamp, called $T_{SB}$, associates the exact machining instruction when the geometric element becomes part of the composite surface within the cell, and the second geometric element timestamp, called $T_{SE}$, associates the exact machining instruction when the geometric element is no longer part of the composite boundary within the cell. As with cell type timestamps, one embodiment presets each of the geometric element timestamps to a preset value $T_P$ that indicates that this timestamp is not yet active. For example, if geometric elements timestamps store the machining instruction in the form of an integer value, then the $T_P$ can be made equal to INT_MAX.

However, unlike cell type timestamps, in one embodiment the $T_{SB}$ geometric element timestamp is not set to $T_P$ because the geometric element timestamps do not exist for given geometric element until that geometric element forms part of the composite boundary within the cell.

For example, the geometric element timestamps of the cell 601 record that geometric elements 604, 607, and 609 became part of the composite surface within the cell at machining instructions 1, 4, and 5, respectively. Therefore, the geometric element 604, cell 601 are associated with $T_{SB}$=1 and $T_{SE}$=$T_P$. Similarly, the timestamps of cell 602 record that geometric elements 607, 609 and 610 became part of the composite surface within the cell at machining instructions 4, 5, and 6, respectively. Additionally, the timestamps of cell 602 record that geometric element 609 became no longer part of the composite surface within the cell at machining instruction 6 when geometric element 610 cut more deeply into the interior of the milled workpiece than 609. Therefore for geometric element 609, cell 602 associated with $T_{SB}$=5 and $T_{SE}$=6. For geometric element 607, cell 602 will have $T_{SB}$=1 and $T_{SE}$=7. For geometric element 610, cell 602 associated with $T_{SB}$=6 and $T_{SE}$=7.

Figure 6C:
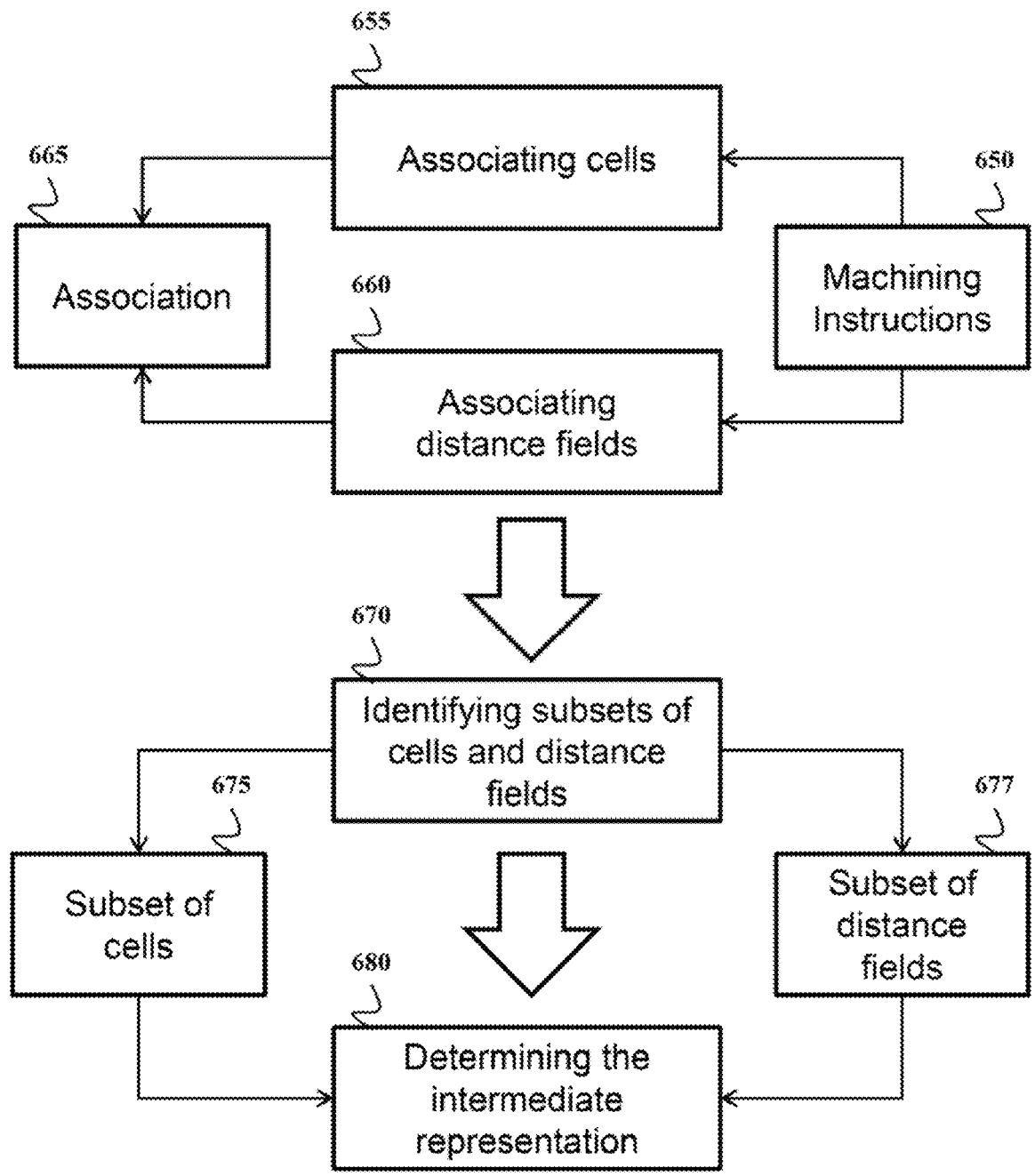
FIG. 6C is a block diagram of a method for determining an intermediate representation of a workpiece represented by a composite adaptive distance field according to one embodiment of the invention.

FIG. 6C shows a block diagram of a method for determining an intermediate representation of a workpiece corresponding to an intermediate instruction from a set of machining instructions simulating a machining of the workpiece represented by the cADF. The steps of the method are performed by a processor.

A cell in the cADF is associated 655 with a machining instruction 650 changing a type of the cell or a type of a distance field within the cell in forming a composite surface of the workpiece to produce at least part of an association 665. In addition, the distance field within the cell is associated 660 with the machining instruction 650 changing the type of the distance field in forming the composite surface of the workpiece to produce at least part of the association 665. The association 665 can be stored in a memory and used for subsequent determination of the intermediate representation of the machined workpiece corresponding to the intermediate machining instruction.

Figure 6D:
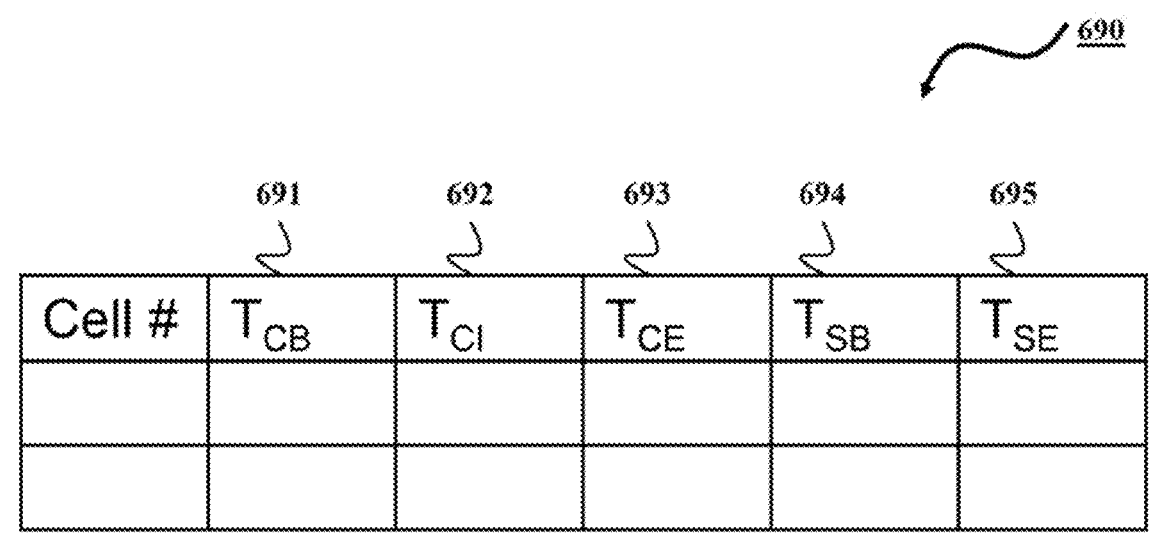

FIG. 6D shows an example of the association 665 in a form of a table 690 according to one embodiment of the invention. In this embodiment, the machining instruction is identified by a number representing an order of the instruction within a set of machining instructions, and the association includes a set of timestamps 691-695, each timestamp records a specific change of the type of cell or the type of the distance field.

For example, the set of timestamps can include the $T_{CB}$ timestamp 691 for recording the $T_{CB}$ machining instruction identified by the number $T_{CB}$ for changing the type of the cell from an interior-type leaf cell to a boundary-type leaf cell. ??unclear The set of timestamps can include the $T_{CI}$ timestamp 692 for recording a $T_{CI}$ machining instruction identified by a number $T_{CI}$ for changing the type of the cell from a boundary-type leaf cell to an intermediate-type cell. The set of timestamps can include $T_{CE}$ timestamp 693 for recording a $T_{CE}$ machining instruction identified by a number $T_{CE}$ changing the type of the cell to an exterior-type leaf cell.

Also, the set of timestamps can include the $T_{SB}$ timestamp 694 for recording a $T_{SB}$ machining instruction identified by a number $T_{SB}$ causing a swept volume represented by the distance field to start forming a part of the composite surface of the workpiece within the cell, and a $T_{SE}$ timestamp 695 for recording a $T_{SE}$ machining instruction identified by a number $T_{SE}$ causing the swept volume represented by the distance field to stop forming the part of the composite surface of the workpiece within the cell. Other representations of the association 665 are possible. For example, the timestamps 694 and 695 can be included into another table to implement many-to-many relationship between cells and distance fields.

Referring back to FIG. 6C, when a command to undo a simulation operation of the machining to the intermediate machining instruction is received, the method identifies 670, using the association 665, a subset of cells 675 and a subset of distance fields 677 forming the composite surface of the workpiece at time of the simulation by the intermediate machining instruction, and determines 680 the intermediate representation of the workpiece using the subset of cells 675 and the subset of distance fields 677.

Rendering Intermediate Representation of the Machined Workpiece

One advantage of the availability of the undo information stored in the association is the ability to render an image of the machined workpiece corresponding to any intermediate machining instruction, i.e. any instruction prior to the last one used in the simulation.

Figure 7A:
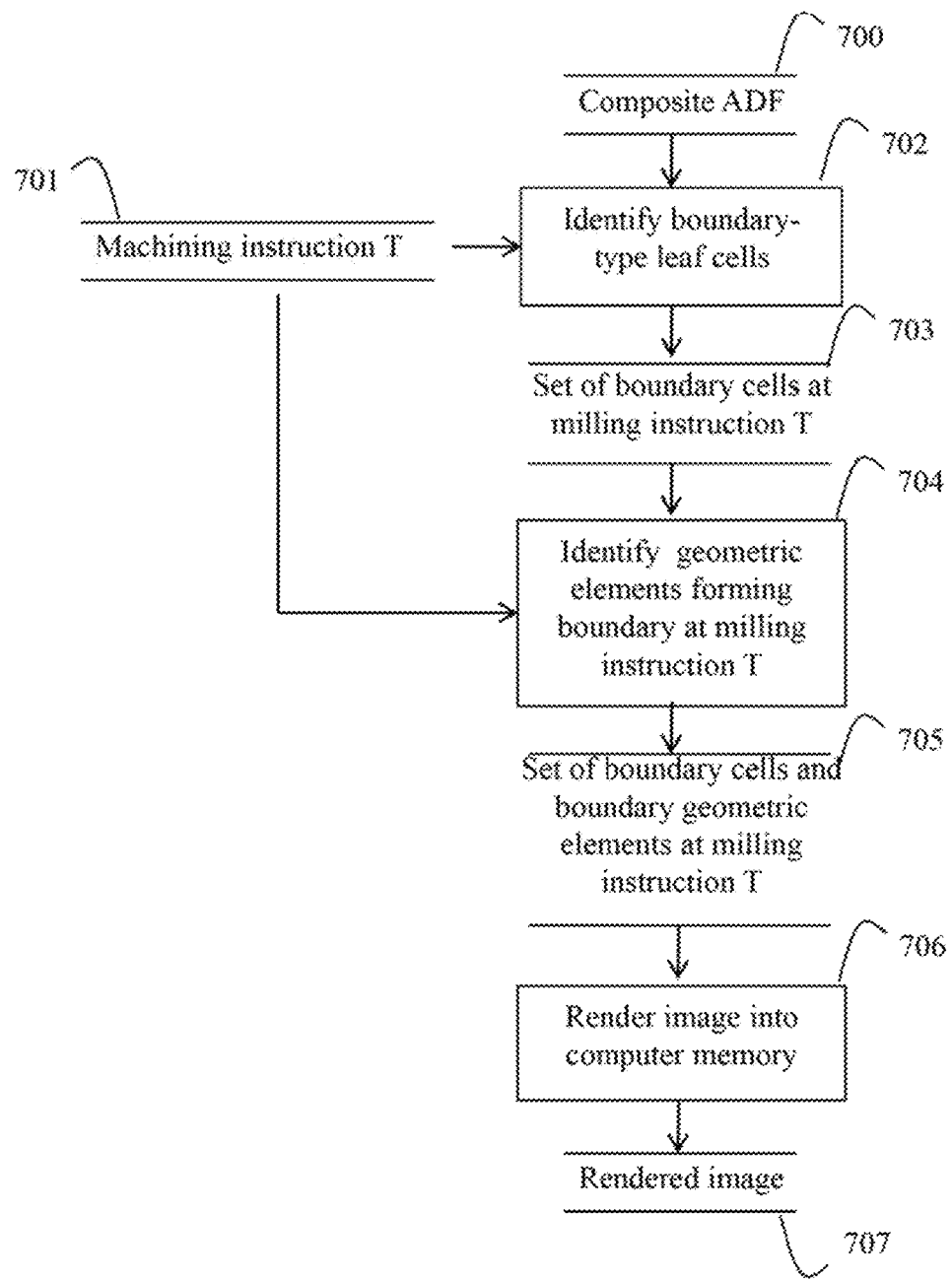
FIG. 7A is a flowchart of a method for rendering an intermediate representation of the workpiece according to one embodiment of the invention.

FIG. 7A shows a flowchart of the rendering process for rendering an image of the cADF 700 corresponding to at an intermediate machining instruction T 701. A first identification step 702 identifies the subset of the set of cells 703 that form the cADF that contain the boundary at machining instruction T. The first identification step 702 in the process of rendering an image of the cADF a cell is performed by determining the subset of the set of cell forming the cADF such that these cells have $T_{CB} \leq T < T_{CE}$ or contain a boundary cell such that $T_{CI} \leq T < T_{CE}$.

Within the cells that contain the boundary as determined by the first identification step 702 a second identification step is performed 704 to identify the subset of the set of geometric elements 705 within the boundary cell that form the composite surface at machining instruction T. The test used to identify if the geometric element forms part of the composite boundary in the second identification step 704 is to find all geometric elements in a cell such that $T_{SB} \leq T < T_{SE}$.

After the subset of cells that are boundary cells 703 is identified in the first identification step 702 and the set of geometric elements that form the composite boundary within each boundary cell 705 is identified in the second identification step 704, then the machined workpiece can be rendered into an image 707 as it appeared at machining instruction T 701 by a rendering algorithm 706, e.g., ray casting. For example, the ray casting can subject the subset of cells with a set of rays incident to the cell from at least one direction and determine the composite surface based on intersection of the rays with surfaces represented by the subset of distance fields.

For example, It is desired to render an image of the machined workpiece in FIG. 6B corresponding to the machining instruction 6. In this case the first identification step uses the cell type timestamps of the cells that form the cADF to identify the boundary-type cells at the machining instruction 6. For example, the cell 601 is an exterior-type cell at machining instruction 6 because cell 601 changes to an exterior-type cell at machining instruction 6. However, the cell 603 is the boundary-type cells because its cell type timestamp indicates the cell 603 that becomes a boundary-type cell at machining instruction 6.

The second identification step 704 identifies that at the machining instruction 6 in cell 602, geometric elements 607 and 610 form parts of the composite boundary, while geometric element 609 does not.

Figure 7B:
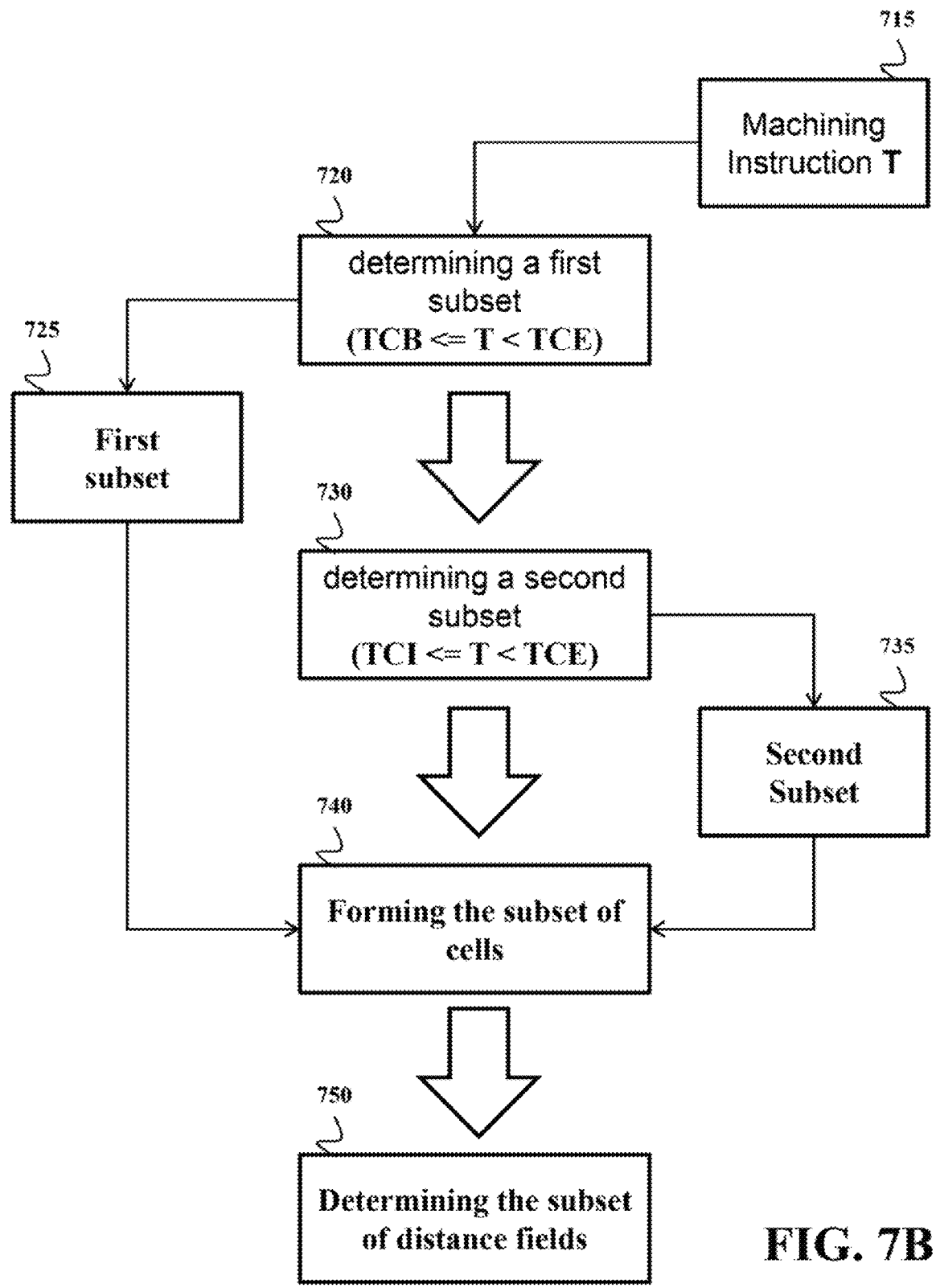
FIG. 7B is a flowchart of a method for determining the subset of cells and the subset of distance field forming a composite surface of the intermediate representation of the workpiece according to one embodiment of the invention.

FIG. 7B shows a flow chart of a method for determining the subset of cells and the subset of distance field within the cells in response to receiving the command to undo the simulation of the machining to the intermediate machining instruction 715 identified by a number T.

A first subset 725 of boundary-type leaf cells associated with the number $T_{CB}$ in the $T_{CB}$ timestamp and with the number $T_{CE}$ in the $T_{CE}$ timestamp is determined 720 such that $T_{CB} \leq T < T_{CE}$. A second subset 735 of boundary cells associated with the number $T_{CI}$ in the $T_{CI}$ timestamp and with the number $T_{CE}$ in the $T_{CE}$ timestamp is determined 730 such that $T_{CI} \leq T < T_{CE}$. The subset of cells is formed 740 as a combination of the first and the second subsets of cells and the subset of distance fields forming the composite surface is determined 750 using the distance fields within the subset of the cells.

Permanent Undo

While rendering an image of a simulated workpiece is useful for identifying the set of machining instruction that caused a simulated machining defect, in order to be able to apply a new set of machining instructions it is necessary to be able to permanently undo the simulated machining back to a particular machining instruction. For example, if in the example of FIG. 6 it was determined that machining instruction 7 by geometric element 611 is the cause of a machining defect, it is necessary to permanently undo the effect of machining instruction 7, and more generally any subsequent machining instructions, so that the simulated workpiece is only modified by machining instruction prior to instruction 7.

Figure 8A:
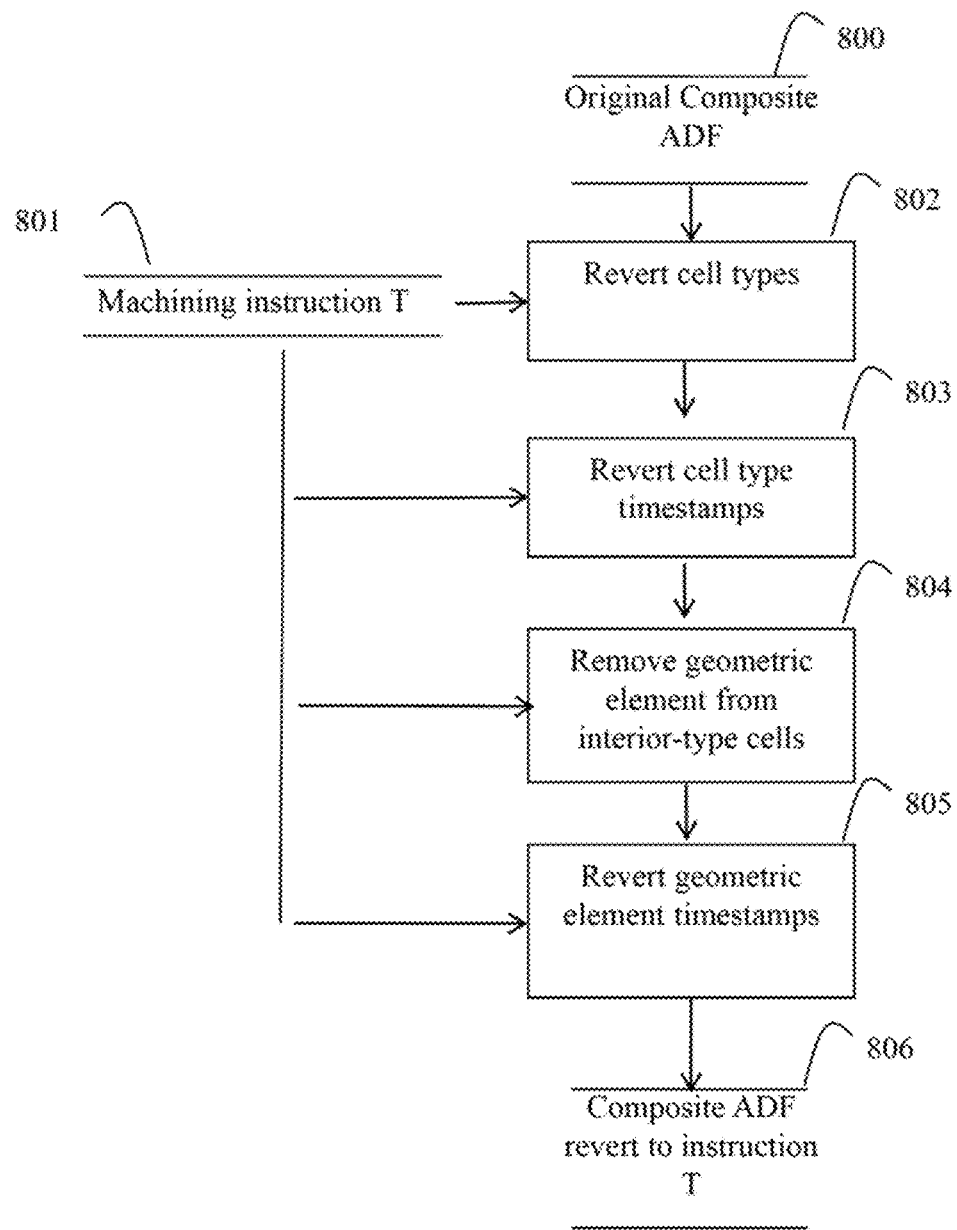
FIG. 8A is a flowchart illustrating permanent undo to an intermediate machining instruction T according to one embodiment of the invention.

FIG. 8A shows a flowchart illustrating permanent undo to an intermediate machining instruction T according to one embodiment. Starting from the original cADF 800, in a first step 802, each cell of the set of cells that form the cADF 800 has its cell type reset to match the cell type at machining instruction T 801. In other words, if $T < T_{CB}$, the cell type is set to interior-type, if $T_{CB} \leq T < T_{CI} < T_{CE}$, the cell type is set to boundary-type, if $T_{CI} <= T < T_{CE}$, the cell type is set intermediate-type and finally if $T_{CE} \leq = T$, the cell type is set to exterior-type.

In a second step 803, the cell type timestamps are adjusted as follows: if $T < T_{CB}$ then $T_{CB}$, $T_{CI}$, and $T_{CE}$, are reset to $T_P$, if $T_{CB} \leq T < T_{CI} < T_{CE}$, then $T_{CI}$, and $T_{CE}$ are reset to $T_P$, and if $T_{CI} \leq T < T_{CE}$, then $T_{CE}$ is reset to $T_P$. In a third step 804 in the process of permanently undoing back to machining instruction T, all geometric elements are removed from each cell whose cell type is changed to interior-type, as these cells do not associated with have any geometric elements if they have never become boundary-type cells.

In a fourth step 805, for all cells that are of boundary-type, intermediate-type, or exterior-type, the sets of geometric elements within the cell are modified as follows: any geometric element with $T < T_{SB}$ is removed from the cell, and any geometric element with $T_{SB} \leq T < T_{SE}$ has $T_{SE}$ reset to $T_P$. The final results of these four step is the cADF 806 that have been reverted to the state corresponding to the intermediate machining instruction T 801.

Figure 8B:
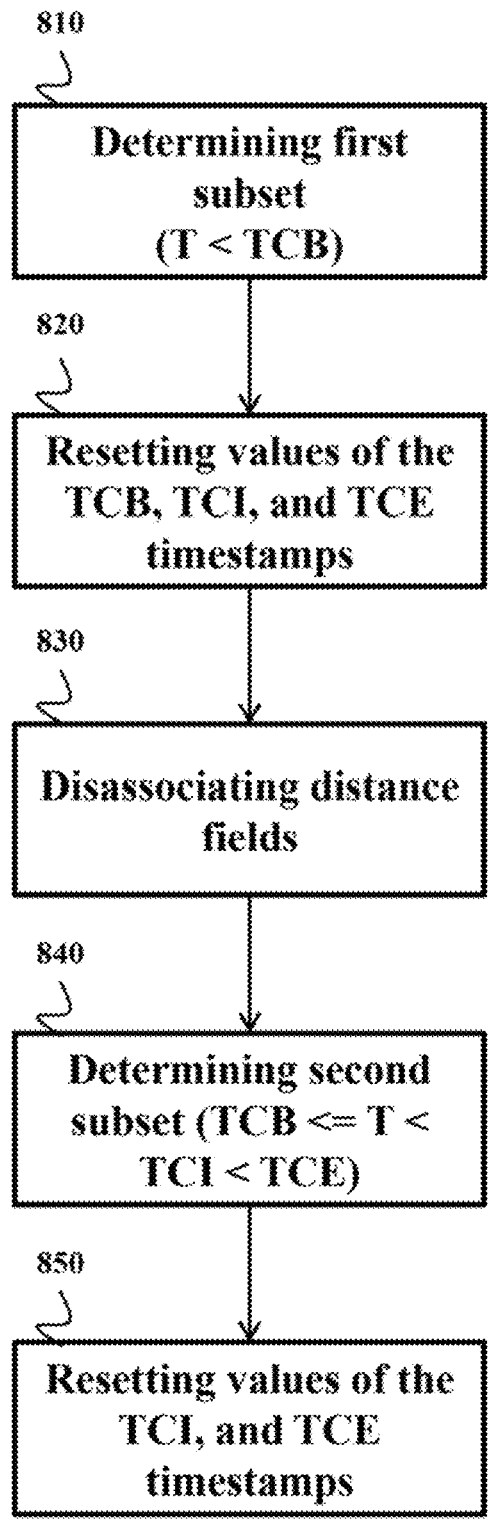
FIG. 8B is a flowchart of a method implementing some principles of the method of FIG. 8A according to one embodiment of the invention.

FIG. 8B shows a flowchart of a method implementing some principles of a method of FIG. 8A according to one embodiment. A first subset of cells associated with the number $T_{CB}$ in the $T_{CB}$ timestamp is determined such that $T < T_{CB}$. The values of the $T_{CB}$ timestamp, the $T_{CI}$ timestamp and the $T_{CE}$ timestamp for each cell in the first subset are resent 820, and each cell from the first subset of cells is disassociated 830 with each distance fields within the cell.

A second subset of cells associated with the number $T_{CB}$ in the $T_{CB}$ timestamp, associated with the number $T_{CI}$ in the $T_{CI}$ timestamp, and associated with the number $T_{CE}$ in the $T_{CE}$ timestamp is determined 840 such that $T_{CB} \leq T < T_{CI} < T_{CE}$ and the values of the $T_{CI}$ timestamp and the $T_{CE}$ timestamp are reset 850 for each cell in the second subset.

Operating Environment

The invention is operational with numerous general purpose or special purpose computing system environments or configurations. Examples of well known computing systems, environments, and/or configurations that are suitable for use with the invention include, but are not limited to, personal computers, server computers, handheld or laptop devices, multiprocessor or multi-core systems, graphics processing units (GPUs), application-specific integrated circuits (ASICs), field programmable gate arrays (FPGAs), microcontroller-based systems, network PCs, mainframe computers, distributed computing environments that include any of the above systems or devices, and the like, i.e., generally processors. A monitor or other type of display device 160 is connected to any of the above systems to enable visualization 162 of the invention.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, a minicomputer, or a tablet computer. Also, a computer may have one or more input and output devices. These devices can be used, among other things, to present a user interface. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, and data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining an intermediate representation of a workpiece corresponding to an intermediate instruction in a set of machining instructions simulating a machining of the workpiece represented by a composite adaptive distance field (cADF), comprising:

associating a cell in the cADF with a machining instruction that changes a type of the cell or a type of a distance field in the cell in forming a composite surface of the workpiece to produce at least part of an association;

associating the distance field in the cell with the machining instruction changing the type of the distance field in forming the composite surface of the workpiece to produce at least part of the association;

identifying, using the association and in response to receiving a command to undo a simulation of the machining to the intermediate machining instruction, a subset of cells and a subset of distance fields forming the composite surface of the workpiece at a time of the simulation by the intermediate machining instruction; and determining the intermediate representation of the workpiece using the subset of cells and the subset of distance fields, wherein steps of the method are performed by a processor, wherein the machining instruction is identified by a number representing an ordering of the instructions in the set of machining instructions, and wherein the association includes a set of timestamps, each timestamp records a specific change of the type of cell or the type of the distance field, and wherein the set of timestamps includes a $T_{CB}$ timestamp for recording a $T_{CB}$ machining instruction identified by a number $T_{CB}$ for changing the type of the cell from an interior-type leaf cell to a boundary-type leaf cell, wherein the set of timestamps includes $T_{CI}$ timestamp for recording a $T_{CI}$ machining instruction identified by a number $T_{CI}$ for changing the type of the cell from a boundary-type leaf cell to an intermediate-type cell, wherein the set of timestamps includes $T_{CE}$ timestamp for recording a $T_{CE}$ machining instruction identified by a number $T_{CE}$ changing the type of the cell to an exterior-type leaf cell, wherein the set of timestamps includes $T_{SB}$ timestamp for recording a $T_{SB}$ machining instruction identified by a number $T_{SB}$ causing a swept volume represented by the distance field to start forming a part of the composite surface of the workpiece within the cell, and wherein the set of timestamps includes $T_{SE}$ timestamp for recording a $T_{SE}$ machining instruction identified by a number $T_{SE}$ causing the swept volume represented by the distance field to stop forming the part of the composite surface of the workpiece within the cell.

2. The method of claim 1, wherein the association includes numbers representing an ordering of the set of machining instructions, such that the number associates the machining instruction with the cell and with the distance field.

3. The method of claim 2, wherein the numbers includes timestamps of the simulating according to the machining instructions, such that the timestamp of the machining instruction associates the machining instruction with the cell and with the distance field changing types at a time of the timestamp.

4. The method of claim 1, further comprising, in response to receiving the command to undo the simulation of the machining to the intermediate machining instruction identified by a number T:

determining a first subset of boundary-type leaf cells associated with the number $T_{CB}$ in the $T_{CB}$ timestamp and with the number $T_{CE}$ in the $T_{CE}$ timestamp, such that $T_{CB} \leq T < T_{CE}$;

determining a second subset of boundary cells associated with the number $T_{CI}$ in the $T_{CI}$ timestamp and with the number $T_{CE}$ in the $T_{CE}$ timestamp, such that $T_{CI} \leq T < T_{CE}$;

forming the subset of cells as a combination of the first and the second subsets of cells; and
determining the subset of distance fields using distance fields within the subset of the cells.

5. The method of claim 4, further comprising:
rendering the intermediate representation of the workpiece based on the set of distance fields.

6. The method of claim 4, wherein the rendering comprises:
subjecting the subset of cells with a set of rays incident to the cell from at least one direction; and
determining the composite surface based on intersection of the rays with surfaces represented by the subset of distance fields.

7. The method of claim 1, further comprising, in response to receiving a command to permanently undo a representation of the workpiece to the intermediate machining instruction identified by a number T:
determining a first subset of cells associated with the number $T_{CB}$ in the $T_{CB}$ timestamp, such that $T<T_{CB}$;
resetting values of the $T_{CB}$ timestamp, the $T_{CI}$ timestamp and the $T_{CE}$ timestamp for each cell in the first subset;
disassociating each cell from the first subset of cells with each distance field within the cell;
determining a second subset of cells associated with the number $T_{CB}$ in the $T_{CB}$ timestamp, associated with the number $T_{CI}$ in the $T_{CI}$ timestamp, and associated with the number $T_{CE}$ in the $T_{CE}$ timestamp, such that $T_{CB} \le T<T_{CI}<T_{CE}$; and
resetting values of the $T_{CI}$ timestamp and the $T_{CE}$ timestamp for each cell in the second subset.

8. A method for determining an intermediate representation of a workpiece corresponding to an intermediate instruction from a set of machining instructions simulating a machining of the workpiece, comprising:
associating each geometrical element with the machining instruction changing a type of a geometrical element in forming a composite surface of the workpiece to produce at least part of an association, such that the geometrical element is associated at least with one or a combination of a machining instruction causing the geometrical element to start forming a part of the composite surface of the workpiece and a machining instruction causing the geometrical element to stop forming the part of the composite surface of the workpiece;
identifying, using the association and in response to receiving a command to undo a simulation of the machining to the intermediate machining instruction, a subset of geometrical elements forming the composite surface of the workpiece at a time of the simulation by the intermediate machining instruction; and
determining the intermediate representation of the workpiece using the subset of geometrical elements, wherein steps of the method are performed by a processor,
wherein the machining instruction is identified by a number representing an ordering of the instructions in the set of machining instructions, and wherein the association includes a set of timestamps, each timestamp records a specific change of a type of a cell or a type of a distance field, and
wherein the set of timestamps includes a $T_{CB}$ timestamp for recording a $T_{CB}$ machining instruction identified by a number $T_{CB}$ for changing the type of the cell from an interior-type leaf cell to a boundary-type leaf cell,
wherein the set of timestamps includes $T_{CI}$ timestamp for recording a $T_{CI}$ machining instruction identified by a number $T_{CI}$ for changing the type of the cell from a boundary-type leaf cell to an intermediate-type cell,
wherein the set of timestamps includes $T_{CE}$ timestamp for recording a $T_{CE}$ machining instruction identified by a number $T_{CE}$ changing the type of the cell to an exterior-type leaf cell,
wherein the set of timestamps includes $T_{SB}$ timestamp for recording a $T_{SB}$ machining instruction identified by a number $T_{SB}$ causing a swept volume represented by the distance field to start forming a part of the composite surface of the workpiece within the cell, and
wherein the set of timestamps includes $T_{SE}$ timestamp for recording a $T_{SE}$ machining instruction identified by a number $T_{SE}$ causing the swept volume represented by the distance field to stop forming the part of the composite surface of the workpiece within the cell.

9. The method of claim 8, wherein the association includes numbers representing ordering within the set of machining instructions, such that a number of an order of a machining instruction associates the machining instruction with the geometrical elements.

10. The method of claim 9, wherein the numbers include timestamps of the simulating according to the machining instructions, such that a timestamp of a machining instruction associates the machining instruction with the geometrical element changing type at the timestamp.

11. A numerically controlled (NC) machining simulation system, comprising:
a memory storing a computer aided design (CAD) model of a workpiece represented by a composite adaptive distance field (cADF);
a NC machining console for determining a set of machining instructions for machining of the workpiece;
a processor for simulating machining of the workpiece according to the machining instructions; and
a display device, wherein the processor is configured to render an intermediate representation of the machined workpiece corresponding to an intermediate machining instruction based on the association, wherein the processor is configured for
associating a cell in the cADF with a machining instruction that changes a type of the cell or a type of a distance field in the cell in forming a composite surface of the workpiece to produce at least part of an association;
associating the distance field in the cell with the machining instruction changing the type of the distance field in forming the composite surface of the workpiece to produce at least part of the association;
identifying, using the association and in response to receiving a command to undo a simulation of the machining to the intermediate machining instruction, a subset of cells and a subset of distance fields forming the composite surface of the workpiece at a time of the simulation by the intermediate machining instruction; and
determining the intermediate representation of the workpiece using the subset of cells and the subset of distance fields, wherein steps of the method are performed by a processor,
wherein the machining instruction is identified by a number representing an ordering of the instructions in the set of machining instructions, and wherein the association includes a set of timestamps, each timestamp records a specific change of the type of cell or the type of the distance field, and
wherein the set of timestamps includes a $T_{CB}$ timestamp for recording a $T_{CB}$ machining instruction identified by a number $T_{CB}$ for changing the type of the cell from an interior-type leaf cell to a boundary-type leaf cell, wherein the set of timestamps includes $T_{CI}$ timestamp for recording a $T_{CI}$ machining instruction identified by a number $T_{CI}$ for changing the type of the cell from a boundary-type leaf cell to an intermediate-type cell, wherein the set of timestamps includes $T_{CE}$ timestamp for recording a $T_{CE}$ machining instruction identified by a number $T_{CE}$ changing the type of the cell to an exterior-type leaf cell, wherein the set of timestamps includes $T_{SB}$ timestamp for recording a $T_{SB}$ machining instruction identified by a number $T_{SB}$ causing a swept volume represented by the distance field to start forming a part of the composite surface of the workpiece within the cell, and wherein the set of timestamps includes $T_{SE}$ timestamp for recording a $T_{SE}$ machining instruction identified by a number $T_{SE}$ causing the swept volume represented by the distance field to stop forming the part of the composite surface of the workpiece within the cell.

* * * * *